(12) United States Patent
Inoguchi et al.

(10) Patent No.: US 7,389,842 B2
(45) Date of Patent: Jun. 24, 2008

(54) SYSTEM FOR EFFICIENT POWER CONTROL ON A SNOWMOBILE

(75) Inventors: Yoshitaka Inoguchi, Shizuoka-ken (JP); Hitoshi Mukurasako, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 385 days.

(21) Appl. No.: 11/258,827

(22) Filed: Oct. 26, 2005

(65) Prior Publication Data
US 2006/0102403 A1    May 18, 2006

(30) Foreign Application Priority Data
Oct. 26, 2004    (JP) .............................. 2004-311073

(51) Int. Cl.
*B62M 27/02* (2006.01)
(52) U.S. Cl. ...................................................... 180/190
(58) Field of Classification Search .................. 180/190
See application file for complete search history.

(56) References Cited

FOREIGN PATENT DOCUMENTS

JP            05-319084          12/1993

*Primary Examiner*—Lesley D. Morris
*Assistant Examiner*—Marc A Scharich
(74) *Attorney, Agent, or Firm*—Knobbe Martens Olson & Bear LLP

(57) ABSTRACT

A power management system for a snowmobile is provided to efficiently manage power supplied to a cooling fan and to a heater on the snowmobile. The power management system can be incorporated into a control unit of the snowmobile and can be comprise of a fan motor control section for activating the fan motor by supplying electric power from a generator (or a battery). The fan motor control section operates the fan motor in various operating conditions in accordance with the value detected by a temperature sensor associated with a fluid cooling system of the snowmobile's engine. The power management system can also include a heat control section for controlling the electric power supplied by the generator (or a battery) to the heater by adjusting it in accordance with such parameters as maximum power levels associated with preset temperature settings or variable temperature settings, an engine speed sensor signal, and the operating condition of the fan motor.

12 Claims, 8 Drawing Sheets

| Engine rotational speed | Warmer output power (%) | |
|---|---|---|
| | Normal mode (fan motor at a halt) | Power-saving mode (fan motor in operation) |
| Low | 30 | 10 |
| Mid | 50 | 35 |
| High | 100 | 70 |

(b)

| | Normal mode Warmer output power (%) (Fan motor at a halt) | | | | | Power-saving mode Warmer output power (%) (Fan motor in operation) | | | | |
|---|---|---|---|---|---|---|---|---|---|---|
| Engine rotational speed | Temperature settings specified by the operator | | | | | Temperature settings specified by the operator | | | | |
| | 1 | 2 | 3 | 4 | 5 | 1 | 2 | 3 | 4 | 5 |
| Low | 0 | 5 | 15 | 20 | 30 | 0 | 3 | 5 | 7 | 10 |
| Mid | 0 | 10 | 25 | 35 | 50 | 0 | 10 | 20 | 24 | 35 |
| High | 0 | 30 | 50 | 70 | 100 | 0 | 20 | 35 | 45 | 70 |

FIG. 7

SYSTEM FOR EFFICIENT POWER CONTROL ON A SNOWMOBILE

CROSS-REFERENCE TO RELATED APPLICATIONS

This application is based on and claims priority under 35 U.S.C. § 119(a)-(d) to Japanese Patent Application No. 2004-311073, filed Oct. 26, 2004, the entire contents of which is hereby incorporated by reference.

BACKGROUND OF THE INVENTION

1. Field of the Invention

The present invention relates to snowmobiles in general and, in particular, to a snowmobile having a heater in the steering handle bars and a system for controlling the electric power provided to that heater.

2. Description of the Related Art

Riders of snowmobiles typically use them for relatively rapid transportation over snow-covered roads and terrains transport in cold weather environments. The combination of speed and cold weather results in occupants experiencing the onrush of running wind. Typically, snowmobiles are controlled by grasping and manipulating steering handle bars. While riding snowmobiles designed to be controlled in this manner, the hands of the operator are situated to experience a substantial amount of running wind. Even with protective thermal covering, hands of the operator can become uncomfortably cold.

Prior snowmobiles have placed heaters in the steering handle bars of the snowmobile where the operator grasps the bars. This can result in the warming of the operator's hands and increased comfort while riding, even with high running wind. Some snowmobiles also have radiators with fans to cool the engine. The electric power to operate the hand heaters is typically drawn from the same generator that supplies power to the radiator fan, the blower fan, as well as other auxiliary electrical equipment, such as the snowmobile's headlight and taillight. Moreover, the same generator is also usually used to charge the snowmobile's battery. Accordingly, during high-speed operation of a snowmobile, when demand for the hand heater is the greatest, the radiator fan may also need a substantial amount of power to cool the snowmobile engine.

When the power supplied to the radiator fan motor exceeds a certain level, the increased total electric power consumption by the radiator fan motor, the snow blower fan motor, the hand heaters, and the auxiliary electrical equipment can place an excessive load on snowmobile's electrical system. Some snowmobiles address this problem by restricting the maximum output of the blower fan motor. This results in decreased performance of the blower fan, which can be undesirable because it typically decreases the snowmobile's overall performance. Additionally, when the power requirements exceed the capacity of the generator, battery power in some prior snowmobiles will be drawn upon to supply the difference. As a result, the battery may be drawn down to a charge level insufficient to crank the snowmobile's motor during starting. Thus, there is a need for a system that provides warmth to the operator's hands while not placing an excessive load on the snowmobile's electrical system or decreasing performance of the blower.

SUMMARY OF THE INVENTION

In accordance with one aspect of the present invention, a snowmobile is constructed which includes an engine, a generator driven by the engine, a battery or other electric storage and supply device, a radiator through which an engine cooling fluid (e.g., an anti-freeze coolant) passes, a fan motor disposed to draw air across at least a part of the radiator, at least one heater disposed on the handgrip of the snowmobile's steering handle bars, and a sensor for detecting the temperature of the fluid inside the radiator. The snowmobile also has a control unit that receives a signal from the temperature sensor. The control unit regulates the operation of the fan motor based on the signal received from the sensor.

In a preferred mode, the fan motor has at least two different operating conditions. In one such operating condition, the fan motor is turned off. The fan motor has another operating condition in which the fan motor is activated and the fan draws air. In another preferred mode, the fan motor has another operating condition in which the speed of the fan motor can be varied and controlled by the control unit.

In another preferred mode, the control unit on the snowmobile has a section focused on the fan motor. This fan motor section controls the fan motor and can operate the fan motor in at least a plurality of operating condition. In yet another preferred mode, the motor fan section responds to a signal from the temperature detector when changing operating conditions of the motor fan.

In an additional preferred mode of the invention, the control unit is a digital device. The control unit receives power from the snowmobile's electrical system and signals from the sensors disposed on the snowmobile. In yet another preferred mode, at least a portion of the control unit is an analog device.

The control unit in some modes also can have a section focused on controlling the heaters. The heat control section adjusts the power provided to the heaters disposed on the steering handle bars. The heat control section varies the power supplied to the heaters so as to control the heaters' output and correspondingly, the load placed on the snowmobile's electrical system during operation of the heaters.

The heat control section preferably has at least two different operating modes. In one such operating mode, the heat control section provides normal power to the heaters. In another such operating mode, the heat control section can conserve power. Power can be conserved by reducing the rate at which power is provided to the heaters. The reduced rate can be proportional to the maximum power supplied while the section is operating in the normal power mode. The proportion by which power is reduced in the power saving mode can be predetermined or selected by the operator.

In a further variation, the snowmobile has an electric power level selector disposed on one of the steering handle bars. The selector is used to change the maximum power levels. The selector is composed of at least two relays, which are connected to the control unit. The relays may be electro-mechanical, solid state, or of another type, the selection of which could be accomplished by one skilled in the art. In another preferred embodiment of the invention, the selector is cyclical, and the operator cycles through all possible selections with a single relay. In yet another preferred embodiment of the invention, the selector is a simple mechanical device which allows the operator to adjust the power level through manipulation of the device.

In another preferred mode of the invention, the control unit can vary the maximum power levels based on signals received from the electric power level selector. The selector can be used to increase or decrease the maximum electric power levels. In yet another preferred embodiment of the invention, the heat control section can maintain fixed maximum power levels for use by the heat control section in determining power levels based on engine speed and activation of the radiator fan motor. In this embodiment, a selector may not be present.

In another preferred mode of operation, when the signal from the temperature sensor results in a measured temperature which exceeds a certain value, the heat control section enters a power saving mode and reduces the output to the heaters. The reduction results in power supplied to the heaters at a proportion of the output of the normal operating mode of the heaters. At substantially the same time, the fan motor section of the control unit changes the operating condition of the fan motor from halted to active. The resulting load from both the radiator fan motor and the heaters is less than a corresponding load with the fan motor activated and the heaters when the heat control section is not in a power saving mode.

In another preferred mode of operation, when the signal from the temperature sensor results in a measured temperature which is below a certain value, the heat control section returns to normal mode. At substantially the same time, the fan motor section changes the operating mode of the radiator fan motor to one in which the fan motor is off.

In accordance with another aspect of the present invention, a snowmobile has a sensor which detects the rotational speed of the engine. The speed sensor communicates by a signal to the control unit. Preferably, the power supplied to the heaters in both a normal and power saving modes of the heat control system changes based upon the engine speed detected. In one variation, the maximum power levels for the heaters are predetermined. The amount of power supplied to the heaters during the power saving mode of the heat control section is a fixed proportion of the maximum power supplied during the normal mode. The engine speed is classified into at least two discrete classifications. Preferably, three classifications are used to represent low, medium, and high rates of engine speed. The power supplied to the heaters by the heat control section correspondingly increases in three discrete steps with increasing engine speed. In another preferred mode of the invention, the speed of the engine is again classified based on the signal received from the speed sensor. When the measured temperature exceeds a certain value, the heat control section reduces the power supplied to the heaters. The amount supplied after reduction is proportional to the amount supplied before reduction based on maximum electric power property values. The maximum electric power property values are selected based on the level selected by the power level selector and the classification of the engine speed. The heat control section selects the lower of the maximum electric power property values based on whether the section is in power saving mode or normal mode and the classified speed of the engine. The maximum electric power property values result in the highest values when the power level selector has selected the highest level and the engine speed is detected as the highest classified speed. The maximum power property values result in the lowest values when the engine speed is detected as the lowest classified speed and the power level selector has selected the lowest level. In all cases, the maximum electric power property values are higher during normal operation mode than the corresponding value in power saving mode.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention maybe embodied or carried out in a manner that achieves or optimizes one advantage or group of advantages as taught herein without necessarily achieving other objects or advantages as may be taught or suggested herein.

All of these modes and variations of the invention are intended to be within the scope of the invention herein disclosed. These and other variations of the present invention will become readily apparent to those skilled in the art from the following detailed description of the preferred embodiments.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 8 figures.

FIG. 7($a$) is an illustration of an exemplary control map that can be stored in memory and used by the power management system of the snowmobile of FIG. 1.

FIG. 7($b$) is an illustration of another exemplary a control map that can be stored in memory and used by the power management system of the snowmobile of FIG. 1.

DETAILED DESCRIPTION OF THE PREFERRED EMBODIMENT

Figure 1:
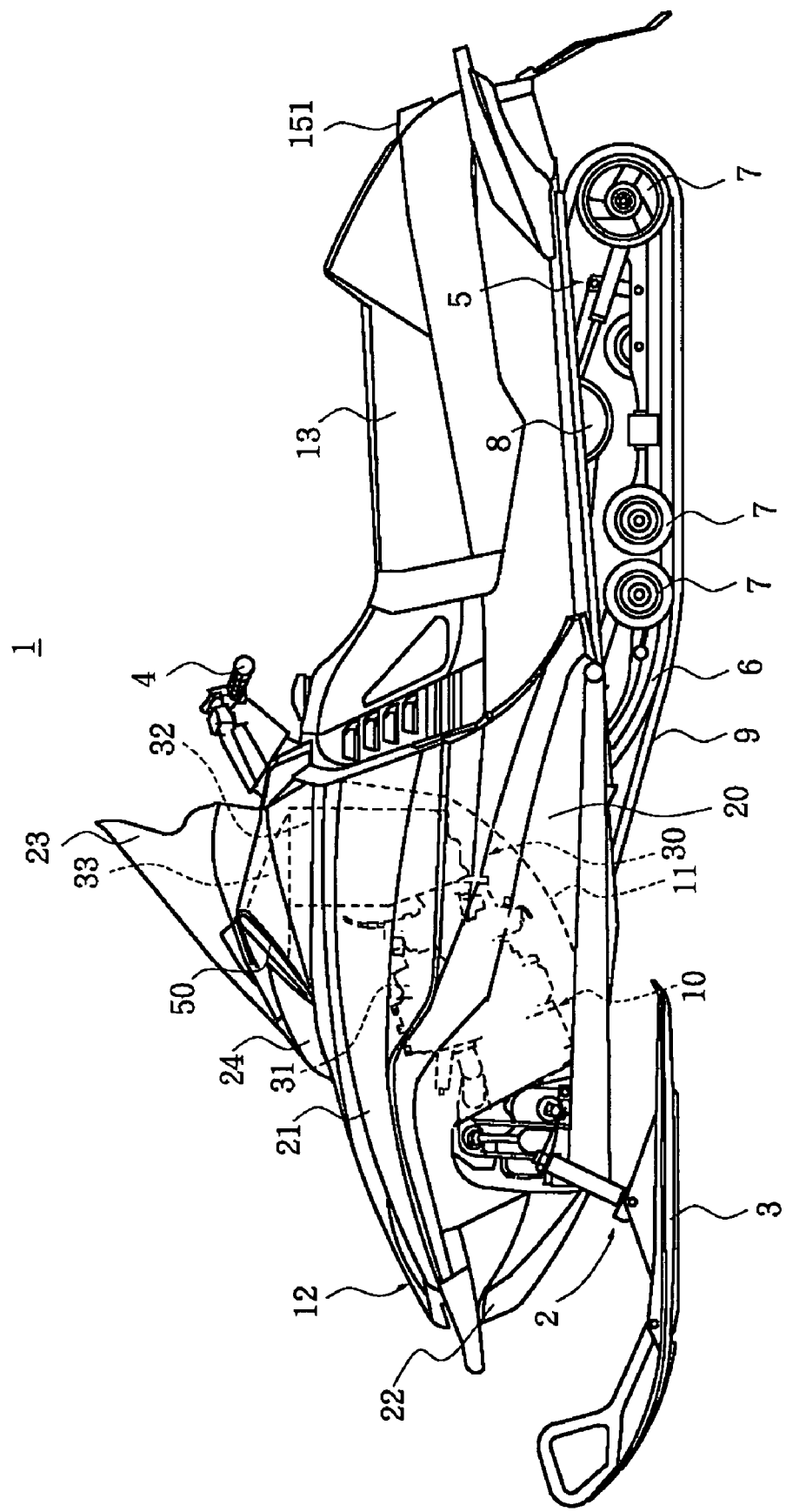
FIG. 1 is a side elevational view of a snowmobile including a power management system configured in accordance with a preferred embodiment of the present invention.

The present power management system is illustrated in the drawings and is described below in the context of an application with a snowmobile. The power management system, however, can be used with other types of vehicle having heated hand grips or other heated sections of the vehicle (e.g., foot wells, seats, cockpits and the like). Before describing the power management system and its operation, the construction of the snowmobile will first be described in connection with FIGS. 1-4.

In the forward part of the snowmobile, a pair of front suspensions 2 are provided on both sides. Each suspension 2 can be rotated together relative the vehicle body. Steering skis 3 are attached to the lower part of respective front suspension 2. The pair of front suspensions 2 are joined to a steering shaft (not shown) that allows their rotation via the operation of a steering handle bar 4.

A rear suspension 5 is provided at the rear of the vehicle body. A slide rail 6 and a suspension wheel 7 are attached to the rear suspension 5. A vehicle body wheel 8 also is provided on the vehicle body. A track belt 9 extends around the suspension wheel 7, the vehicle body wheel 8, and a driving wheel of the driving unit (not shown). The slide rail 6 guides the track belt 9 when the driving wheel powers the track belt 9.

An engine 10 drives the driving unit in the illustrated embodiment. The engine 10 is mounted in an engine compartment 11 formed at the forward part of the vehicle body. The engine compartment 11 can be defined by a vehicle body cover 12. A seat 13 is provided to the rear of the engine compartment 11.

Figure 2:
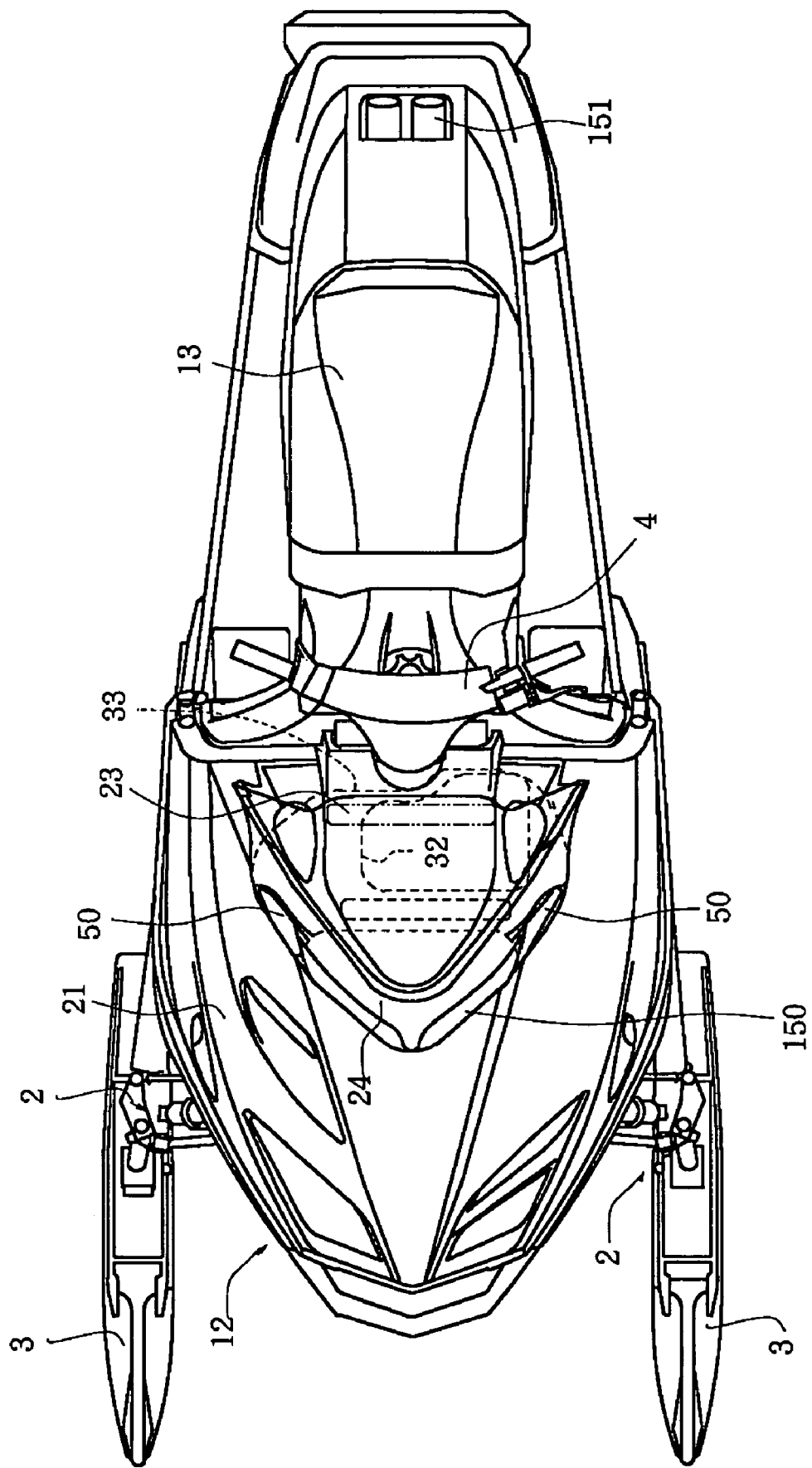
FIG. 2 is a top plan view of the snowmobile of FIG. 1.
Figure 3:
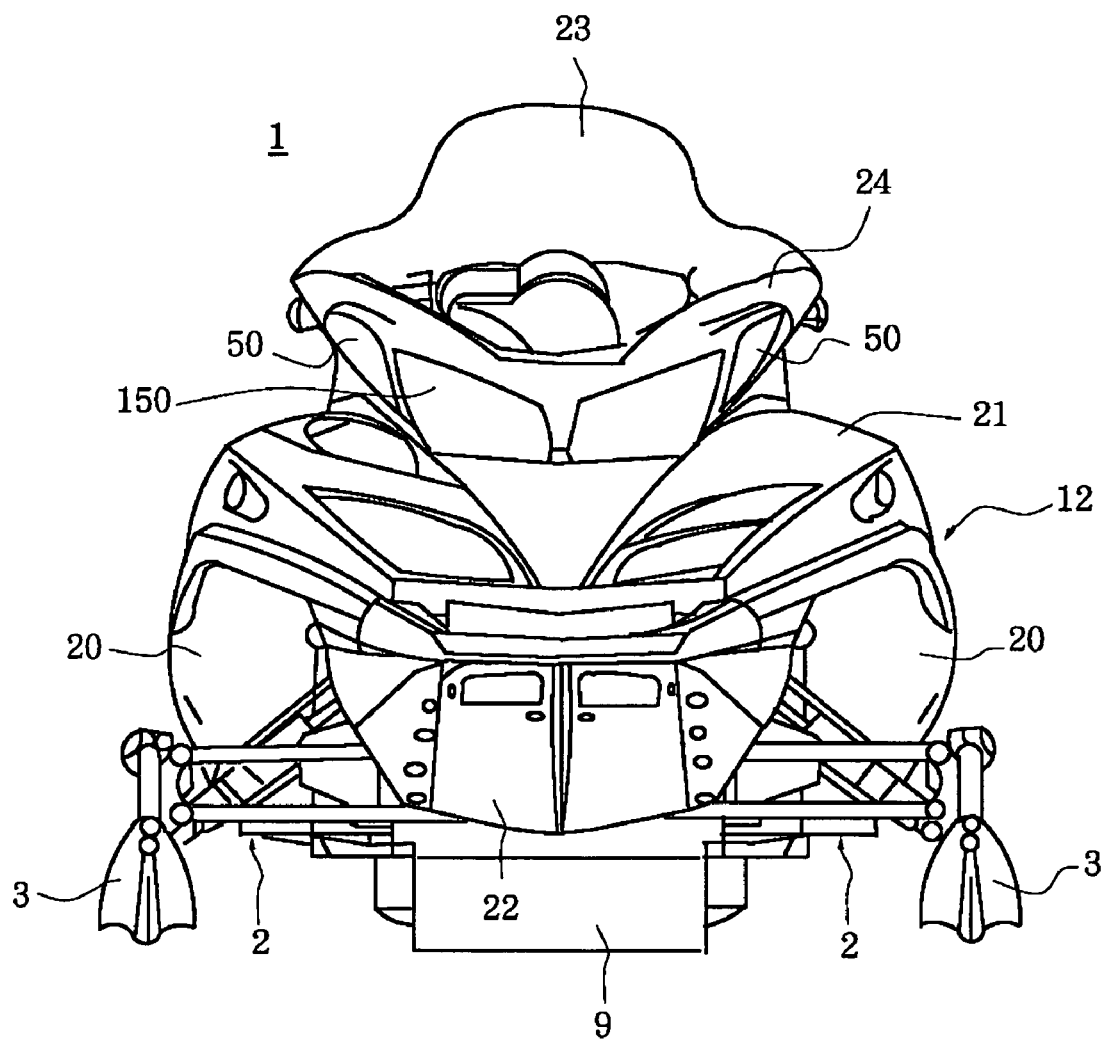
FIG. 3 is a front elevation view of the snowmobile of FIG. 1.

As best seen in FIGS. 1-3, the vehicle body cover 12 preferably is constructed with a body panel 20 covering both sides, a hood 22 covering the lower part of the front end, and a shroud 21 covering at least the top of the engine compartment. The shroud 21 preferably has an upraised part 24 at its top that lies in front of the steering handle bar 4. The upraised part 24 preferably supports a shield 23.

Figure 4:
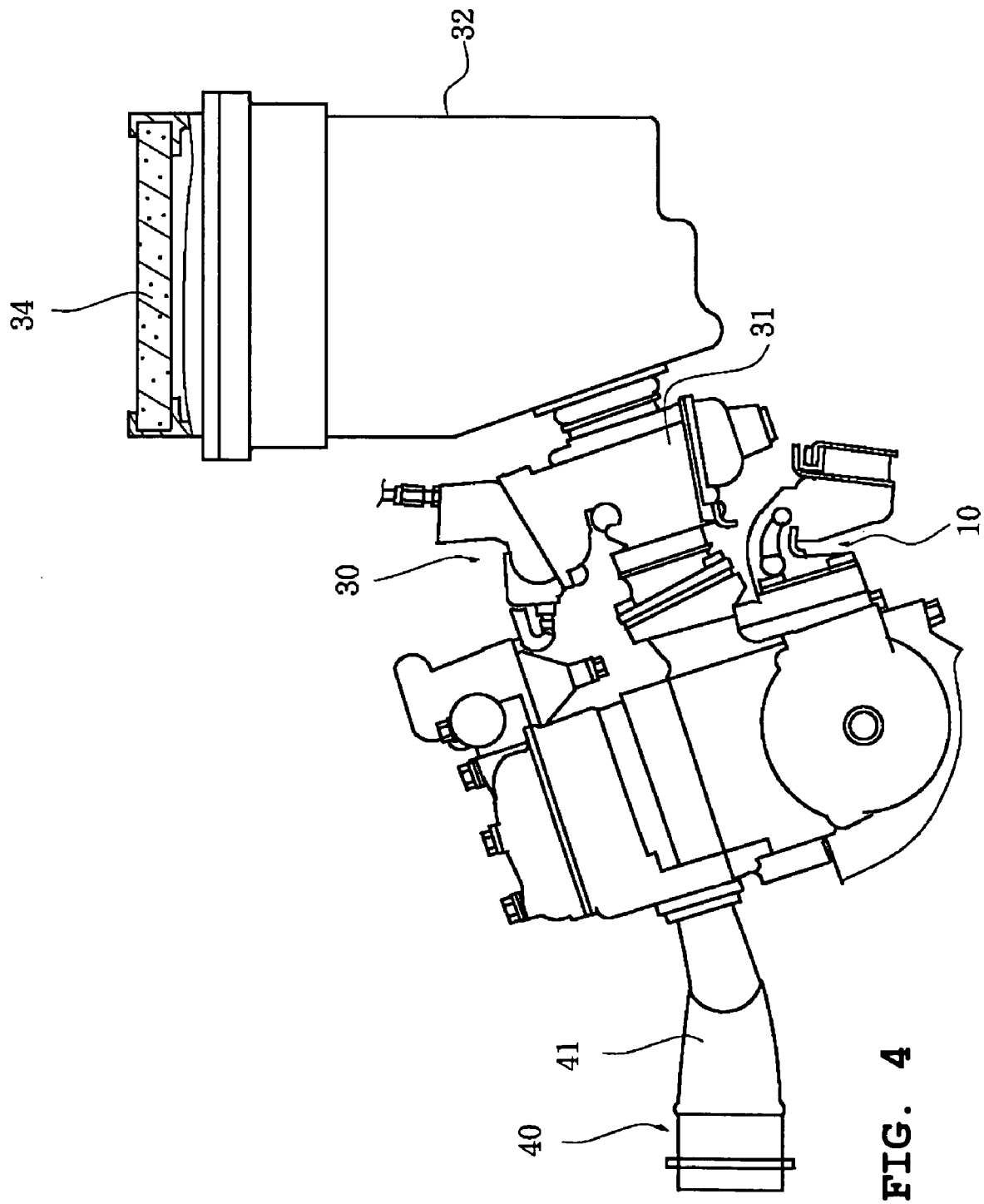
FIG. 4 is a side view of an engine of the snowmobile of FIG. 1.

With reference now to FIG. 4, an exhaust system 40 preferably is disposed to the front side of the engine 10. The exhaust system 40 in the illustrated embodiment is comprised of an exhaust pipe 41 connected to the engine 10. In addition, an induction system 30 is disposed at the upper rear side of the engine 10. The induction system 30 preferably includes a carburetor 31, an air intake box 32 connected to the carburetor 31, and the air intake passage 33 (see FIG. 1) disposed above the air intake box 32. The intake passage 33 extends from the engine compartment 11 and opens to the atmosphere on an upper side of the snowmobile 1. In the illustrated embodiment, a portion of an engine cooling system (described below) can extend adjacent to a portion of the induction system 30 in order to affect the temperature of the air and/or fuel within the induction system 30 under at least some operating condition of the engine. While the engine is illustrated in FIG. 4 as a carbureted, crankcase compressed, 2-stock, in-line, transverse-mounted engine, engines having other configurations (e.g., V-shaped, opposing, etc.), having other orientations (e.g., longitudinally mounted), employing other charging mechanisms (e.g., fuel injection, turbo-charging, super-charging, etc.) and operating on other combustion principles (e.g., 4 stroke) can also be used.

The air intake passage of the air intake box 32 preferably has a filter 34 disposed at the air intake opening. The filter 34 can be made of polyurethane foam or the like, inhibiting the admission of snow and debris. The filter can easily be taken out to melt the accumulated ice.

As best seen in FIG. 1, the air intake passage 33 preferably lies generally in an enclosed area, positioned above the shroud 21 and inside of the upraised part 24. An air intake inlet opening 50 can be disposed on both sides of the upraised part 24 to introduce the running wind into the air intake passage 33. The fresh air aspirated at the intake air inlet opening 50 can be introduced directly into the air intake box 32 via the air intake passage 33 to provide generally a supercharging or ram effect. In addition, the air intake inlet opening 50 preferably is disposed at the upraised part 24, and is located at a higher position in front of the steering handle bar 4. This location on top of, and forward of, the air intake box 32 allows the smooth intake of the running wind. This position also inhibits water intrusion into the engine by snow entering the induction system through the air intake inlet opening 50.

Figure 5:
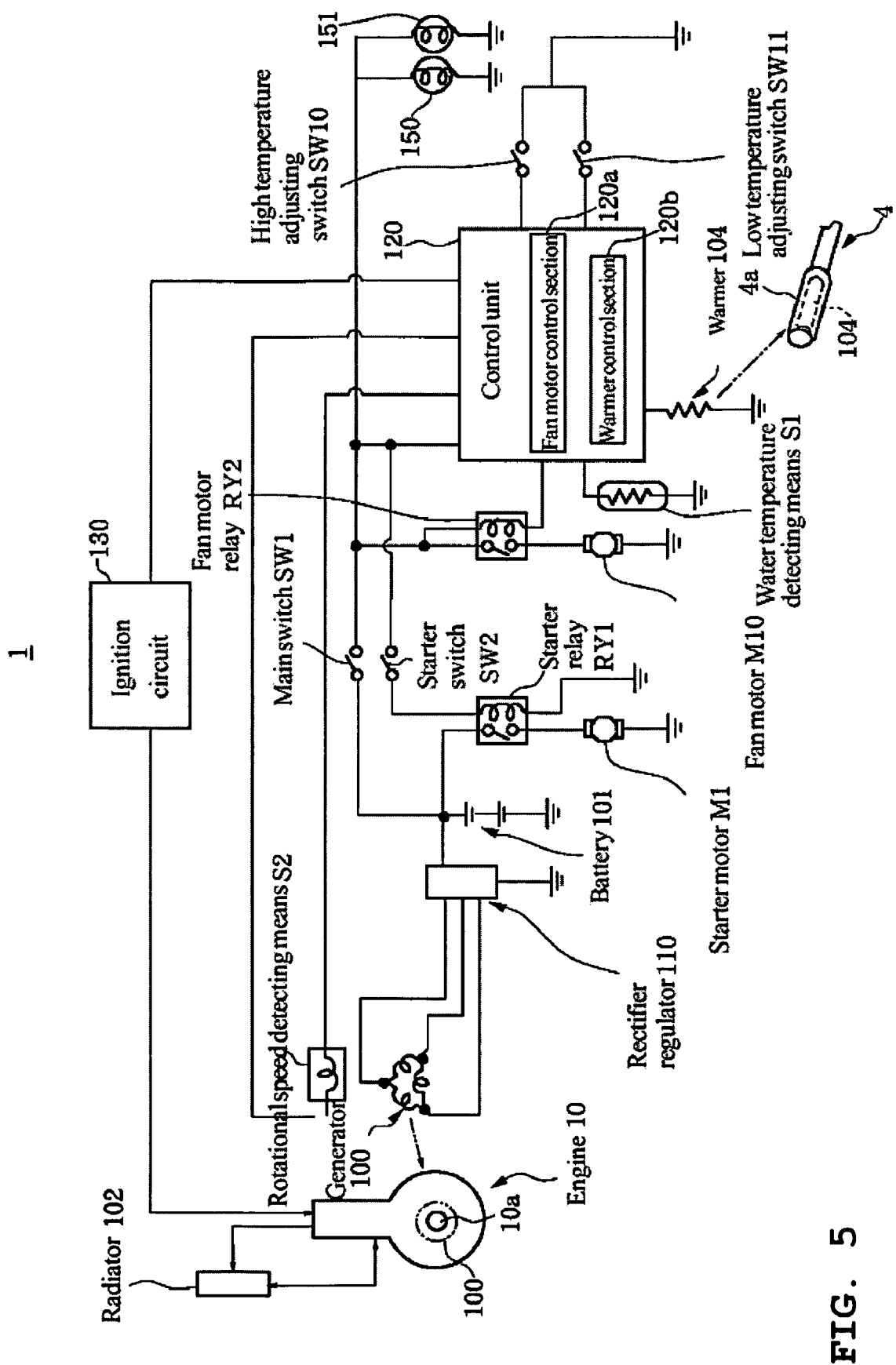
FIG. 5 is a circuit diagram showing a portion of an electrical system, including the power management system, of the snowmobile shown in FIG. 1.

The power management system will now be described with reference to FIG. 5 through FIG. 8. As seen in FIG. 5, the snowmobile 1 in this embodiment includes a generator 100 driven by the engine 10, a battery 101 charged by the generator 100, a radiator 102 in which the cooling fluid of the engine 10 circulates, a fan motor M10 for drawing air across at least a portion of the radiator 102, a heater 104 disposed on the grip portion 4a of the steering handle bar 4 to warm up the operator's hands while he or she grips the steering handle bar 4, and a first sensor S1 for detecting the cooling fluid temperature. The engine in this embodiment 10 is a water-cooled two-stroke-cycle engine (although the engine can be a water-cooled four-stroke engine as well). The generator 100 can be driven by the rotation of the crankshaft 10a. The generator 100 can be an AC generator (an alternator). The alternating current can be converted to a direct current, and the voltage can be regulated to the predetermined level through the use of a rectifier regulator 110 before being charged into the battery 101. The generator 100 can also supply electric power to the electrical equipment of the snowmobile and the engine, such as, for example, a headlight 150, a taillight 151, sparkplugs, fuel injectors and the like.

The rectifier regulator 110 and the battery 101 connected to the generator 100 can be connected further to a control unit 120, which in the illustrated embodiment comprises the power management system, by way of a main switch SW1. A starter switch SW2 and a starter relay RY1 can be connected in parallel with the main switch SW1. While at least portions of the power management system preferably are embodied in hardware (including integrated circuits), software and/or firmware, analog circuitry can also be used.

Turning on the main switch SW1, and then turning on the starter switch SW2 in this condition closes the starter relay RY1. When closed, the starter relay RY1 connects the starter motor M1 to the battery 101 to power the starter motor M1. Once the starter motor M1 operates and is engaged with the crankshaft 10a, the crankshaft 10a of the engine 10 rotates to crank the engine 10.

The snowmobile 1 preferably has a second sensor S2 for detecting the engine rotational speed. The second sensor S2 in the illustrated embodiment includes a pickup coil for detecting crankshaft rotation. The information on the engine rotational speed detected by the second sensor S2 is transmitted to the control unit 120. The control unit 120 can govern one or more engine functions and systems (e.g., ignition timing by controlling operation of the ignition circuit 130) based on the information provided by the second sensor.

The control unit 120 controls the fan motor M10 through the use of a fan motor relay RY2. The fan motor relay RY2 can be a solid-state relay or an electro-mechanical relay as illustrated. In addition, the control unit 120 can be connected to a high temperature adjusting switch SW10 and a low temperature adjusting switch SW11, both switches constituting an electric power level selector. For example, in the illustrated embodiment, the temperature setting for the heater 104 increases every time the high temperature adjusting switch SW10 is turn on, and decreases every time the low temperature adjusting switch SW11 is turn on. Other modes of operation can also be employed. The heater 104 in the illustrated embodiment is a resistive heater that raises or to lowers its temperature based upon operation of the switches. The power management system can also be used with other types of heaters, in which a component of the heater draws electrical power. The fan motor M10 and the heater 104 preferably operated using electrical power supplied by the generator 100.

Figure 8:
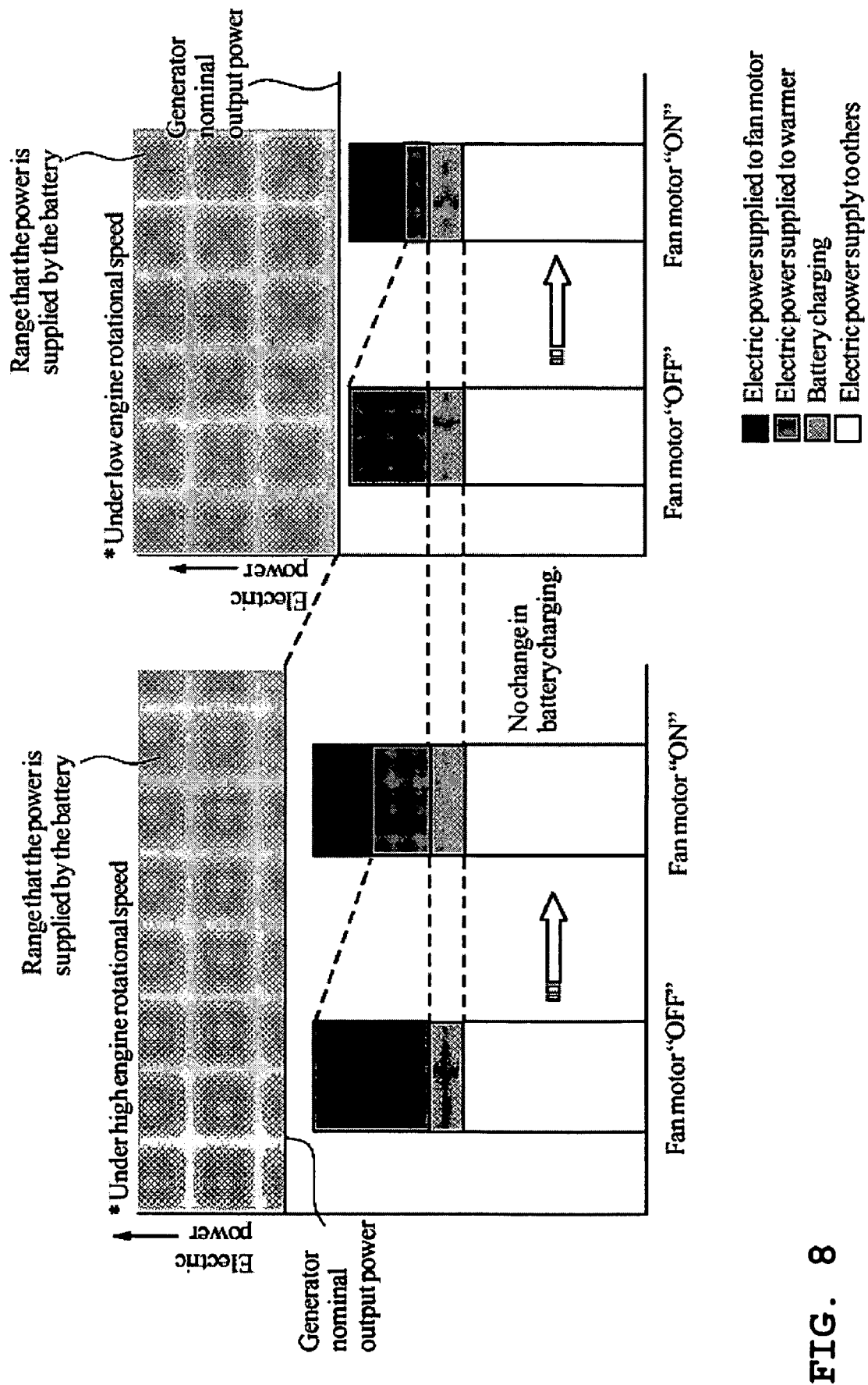
FIG. 8 is a graphical description of the relation between the fan motor operation and the electric power under several operating conditions.

The control unit 120 includes a fan motor control section 120a and a heat control section 120b, which together form at least a portion of the power management system. The fan motor control section 120a can change the operating condition of the fan motor M10 by controlling the fan motor relay RY2, based on the cooling fluid temperature of the engine 10 detected by the first sensor S1. The heat control section 120a can be configured to adjust the electric power supply from the generator 100 to the heater 104 by increasing or decreasing it in accordance with the rated output of the generator 100 and the operating conditions of the fan motor M10. In this context, the rated output of the generator 100 varies in accordance with the rotational speed of the engine 10, as shown in FIG. 8.

Figure 6:
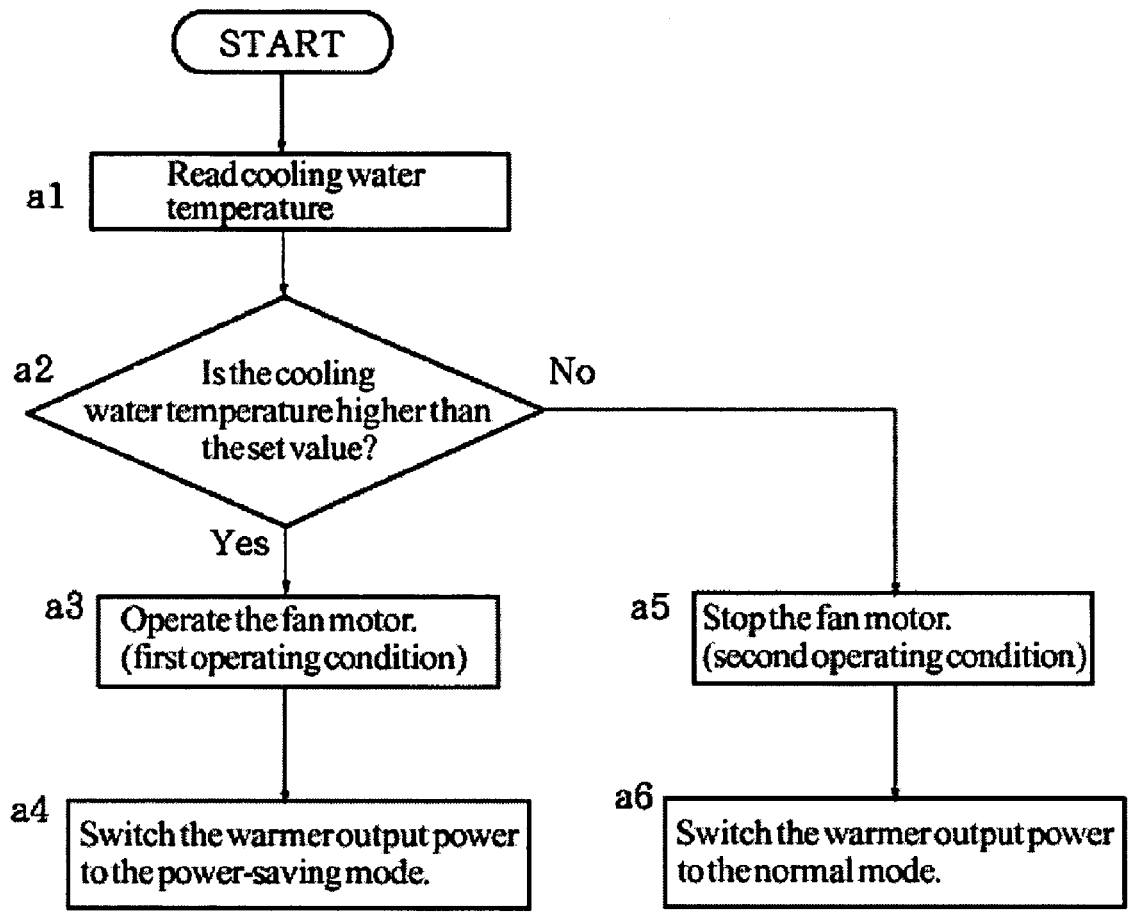
FIG. 6 is a flow chart for power control performed by the power management system.

Next, operation of the snowmobile 1 according to this embodiment will be described with reference to a control flow chart shown in FIG. 6. As the engine 10 is operated, the cooling fluid temperature of the engine 10 detected by the first sensor S1 is read into the control unit (Step a1). In Step a2, a determination is made whether the cooling fluid temperature of the engine 10 is higher than the temperature setting or not. If the cooling fluid temperature of the engine 10 is actually higher than the temperature setting, the fan motor M10 is activated (Step a3). At this point, the fan motor M10 is in the first operating condition, in which the output of the heater 104 is switched to the power saving mode (Step a4).

In Step a2, a determination is made whether the cooling fluid temperature of the engine 10 is lower than the temperature setting or not. If the cooling fluid temperature of the engine 10 is actually lower than the temperature setting, the fan motor M10 is brought to a halt (Step a5). At this point, the fan motor M10 is in the second operating condition, in which the output of the heater 104 is switched to the normal mode (Step a6).

In this embodiment, the electric power supply from the generator 100 to the heater 104 can be controlled by adjusting it in accordance with the rated output of the generator 100 and the operating conditions of the fan motor M10. This allows the electric power supplied to the fan motor M10 and the heater 104 to be kept constantly below the rated output of the generator 100. Thus, the power consumption of the battery 101 can be reduced to the maximum extent possible. It also allows the increment of maximum power supply to the heater 104 to be the highest level possible within the rated output range of the generator 100 based on the operating condition of the fan motor M10.

Furthermore, the fan motor M10 has at least a first and second operating condition. In one embodiment, the first operating condition is the state in which the fan motor M10 is activated and the second operating condition is the state in which the operation of the fan motor M10 is at a halt. In another embodiment, the second operating condition refers to the state in which less electric power to drive the fan motor M10 is supplied relative to the first operating condition. This includes the state in which the fan motor M10 is at a halt. Of course, the fan can also have additional operating conditions that define either set rotational speed levels or variably speeds of a preset range of speeds. However, for purposes of describing the operation of the present power management system, the following explanation uses the "first operating condition" to indicate an operating state where the fan is running, and uses the "second operating condition" to indicate an operating state where the fan is turned off.

In the first operating condition, the heat control section 120b can set the power supplied to the heaters while in the power saving mode, such that the power supplied in the first operating condition is reduced to a certain proportion relative to the power supplied from the generator 100 to the heater 104 in the second operating condition. In the second operating condition, the heat control section 120b can set the output power of the heater 104 to the normal mode.

The settings of the power saving mode and the normal mode for two variations are indicated in FIGS. 7(a) and 7(b). As shown in FIG. 7(a), in the second operating condition with the fan motor M10 turned off, the power can be supplied from the generator 100 to the heater 104 when set in the normal mode at the duty ratios of 30%, 50% and 100%, each corresponding to the low, medium, and high classifications of engine speed. In the first operating condition, with the activated fan motor M10, the power supplied from the generator 100 to the heater 104 is automatically set in the power saving mode, and the reduced electric power can be supplied to the heater 104 at the duty ratios of 10%, 30%, and 70%, each corresponding to the low, mid, and high engine speeds when using predetermined maximum electric power property values. This control map does not account for the handgrip heater temperature settings established by the operator using the temperature setting switches SW10, SW11. As such, it can also be used with a snowmobile that omits the temperature setting switches SW10, SW11.

FIG. 7(b) illustrates a control map that can be used with the power management system illustrated in FIG. 5 and that accounts for the handgrip heat temperature setting. As shown in FIG. 7(b), while in the second operating condition with the fan motor M10 turned off, the power supplied from the generator 100 to the heater 104 is set in the normal mode, and can be set in accordance with the regulated temperatures that are manually set by the operator, with each temperature corresponding to the low, mid, and high engine speeds. In this preferred embodiment, the regulated temperatures are defined in 5 steps. An operator can select these temperatures manually by controlling the high temperature adjusting switch SW10 and the low temperature adjusting switch SW11 that constitute the electric power level selector. In this preferred embodiment, the electric power supplied to the heater 104 is determined based on the 5 steps of regulated temperatures. In the first operating condition, with the activated fan motor M10, the power supplied from the generator 100 to the heater 104 is set in the power saving mode, and the electric power is cut back to the power saving rate and supplied to the heater 104 based on the 5 selectable levels of power and corresponding to the low, medium, and high engine speeds.

In this manner, the heat control section 120b can set the maximum electric power supplied from the generator 100 to the heater 104, based on the maximum electric power property values that change in accordance with the current engine speed detected by the second sensor S2. While the fan motor M10 is in the first operating condition, the maximum electric power property values can be adjusted to the reduced level proportional to the maximum electric power property values in the second operating condition of the fan motor M10.

In the snowmobile 1 described by this embodiment, the running speed usually increases as the engine rotational speed gets higher, and the running wind correspondingly increases. As a result, the higher running wind hits the grip portion 4a of the steering handle bar 4, thus the higher temperature is required at the heater 104, and additional electric power must be supplied to the heater 104. In this embodiment, the electric power supplied to the heater 104 increases as the engine rotational speed is raised from low to mid, and mid to high speeds both in the normal mode and in the power saving mode, as shown in FIGS. 7(a) and (b).

While the fan motor M10 is in the first operating condition, the maximum electric power property values supplied to the heater 104 can be adjusted to the reduced level at the predetermined proportion relative to the maximum electric power property values in the second operating condition of the fan motor M10. Regardless of such adjustment, however, the adequate electric power required for the actual running conditions can be supplied to the heater 104, by altering the maximum electric power supply from the generator 100 to the heater 104 in accordance with the current detected engine speed, and thus raising the maximum electric power level in proportion to the discrete classifications of engine speed.

In addition, two or more predetermined electric power property values can be set for the power supplied to the heater 104 in accordance with the speed detected by the second sensor S2. Any property value can be selected from these two or more property values by controlling the high temperature adjusting switch SW10 and the low temperature adjusting switch SW11 that constitute the apparatus for defining the electric power level. Comparison can be made between the property value selected by the electric power level selector and the maximum electric power property value, both corresponding to the current detected speed. Next, the electric power of the smaller value obtained from the comparison determines the power to be supplied by the generator 100 to the heater 104. Any property value can be selected from these two or more property values; comparison can be made between the selected property value and the maximum electric power property value, both corresponding to the current detected speed, and the smaller value obtained from the electric power comparison determines the power to be supplied by the generator 100 to the heater 104. In this way, the heater 104 can be supplied with the electric power desired by the operator, and within the rated output range of the generator 100.

In this embodiment, the generator 100 has different output power under the higher and lower engine rotational speeds as shown in FIG. 8. The output power of the generator 100 can become larger under the higher engine rotational speeds compared to the output power under the lower engine rotational speeds. The electric power supplied by the battery 101 can become larger under the lower engine rotational speeds in comparison with the power supplied under the higher engine rotational speeds.

The electric power charged to the battery 101, the electric power supplied to other electrical equipment such as the headlight 150 and the taillight 151, and the electric power supplied to the fan motor M10 can remain unchanged under the output power of the generator 100 during the higher engine rotational speeds. Additionally, they can remain unchanged under the output power of the generator 100 while the engine operates at lower rotational speeds.

The electric power supplied to the heater 104 can become larger under the higher engine rotational speeds in comparison with the power supplied under the lower engine rotational speeds. Also, the electric power supplied to the heater 104 can be reduced while the fan motor M10 is running in the first operating condition. In this way, it can be assured that the electric power will not exceed the rated output of the generator.

Additionally, the ambient temperature is usually relatively high when the fan motor M10 runs in the first operating mode and the smaller amount of electric power will be sufficient to supply to the heater 104. Thus, the wasteful consumption of electric power by supplying unnecessary power to the heater 104 can be avoided. By contrast, the ambient temperature is usually relatively low when the fan motor M10 is at a halt. In such situations, a larger electric power can be supplied to the heater 104, which assures an adequate electric power supply to the heater 104.

The starter motor M1 can be mounted on the snowmobile 1 for cranking the engine 10, and can be activated by the battery 101. Because the power drawn from the battery 101 during operation can be reduced to the extent possible, the battery 101 can supply the adequate power to the starter motor M1 at the time of engine starting in more situations than in prior snowmobiles.

The running speed usually increases as the engine rotational speed gets higher and the running wind increases correspondingly. Because of the arrangement to make the running wind hit the radiator 102 directly, the radiator 102 can be cooled sufficiently, resulting in the smaller electric power supply requirement for the fan motor M10. Consequently, the rated output of the generator 100 does not exceed the electric power supplied to the heater 104 even when it is increased to correspond to increasing engine speed.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A snowmobile comprising:
   a vehicle body;
   an engine supported by the vehicle body, the engine having a cooling system through which a coolant flows;
   a generator driven by the engine;
   an electric power supply charged by the generator;
   a radiator through which at least a portion of the coolant from the engine passes;
   a fan disposed to draw air across at least a portion of the radiator, the fan having a fan motor;
   a steering handle coupled to the vehicle body, the steering handle including at least one hand grip heated by a heater;
   a sensor detecting a temperature of the coolant; and
   a control unit receiving a signal from the sensor and controlling operation of the fan motor and the heater based upon the signal received from the sensor.

2. The snowmobile of claim 1, wherein the control unit comprises a fan motor control section configured to control operation of the fan motor under at least some operating conditions of the engine and based upon at least the signal from the sensor.

3. The snowmobile of claim 2, wherein the control unit further comprises a heat control section configured to control electric power supplied to the heater under at least some operating conditions of the engine and based upon at least the operating condition of the fan.

4. The snowmobile of claim 1, wherein the control unit comprises a heat control section configured to control electrical power supplied to the heater based at least upon an operating condition of the fan motor and a control signal provided by a manually operated heat level control switch.

5. The snowmobile of claim 1, wherein the control unit controls electrical power supplied to the heater based at least in part upon at least one maximum electrical power property value of either a battery or the generator.

6. The snowmobile of claim 1, wherein the fan motor has at least a first operating condition, in which the fan motor runs, and a second operating condition, in which the fan motor is turned off, and the control unit is configured to operate the heater in a power saving mode under the first operating condition of the fan such that the power supplied to the heater is reduced to a ratio relative to the power supplied to the heater in the second operating condition.

7. The snowmobile of claim 6 additionally comprising at least one control switch to establish a plurality of maximum power levels for the heater, wherein the control unit is configured to reduce the heater's maximum power levels during the fan motor's first operating condition by a predetermined ratio relative to the maximum power levels in the second operating condition of the fan motor.

8. The snowmobile of claim 7, wherein the snowmobile further comprises a sensor detecting a rotational speed of the engine.

9. The snowmobile of claim 8, wherein a heat control section sets the maximum electric power supplied to the heater based on predetermined maximum power levels changing in accordance with the signal from the sensor detecting engine rotational speed.

10. The snowmobile of claim 7, wherein the electric power is supplied to the heater based at least upon on the maximum power level selected by the control switch.

11. A snowmobile comprising a vehicle body, an engine supported by the vehicle body, the engine having a cooling system through which a coolant flows, a generator driven by the engine, a radiator through which at least a portion of the coolant from the engine passes, a fan disposed to draw air across at least a portion of the radiator, the fan having a fan motor, a steering handle coupled to the vehicle body, the steering handle including at least one hand grip heated by a heater, a sensor detecting a temperature of the coolant, and power management means for reducing electrical power to the heater of the hand grip when the fan motor is running.

12. The snowmobile of claim 11, wherein said power management means further varies electrical power to the heater based upon an input signal from a temperature level control switch that is manually operated.

* * * * *

UNITED STATES PATENT AND TRADEMARK OFFICE
CERTIFICATE OF CORRECTION

PATENT NO.       : 7,389,842 B2  Page 1 of 1
APPLICATION NO.  : 11/258827
DATED            : June 24, 2008
INVENTOR(S)      : Inoguchi et al.

It is certified that error appears in the above-identified patent and that said Letters Patent is hereby corrected as shown below:

At Sheet 7 of 8 of the Drawings, line 1 (FIG. 7), above "Warmer output power (%)" please insert -- (a) --.

Signed and Sealed this

Tenth Day of February, 2009

JOHN DOLL
*Acting Director of the United States Patent and Trademark Office*